(12) United States Patent
Gaiser

(10) Patent No.: US 8,776,865 B2
(45) Date of Patent: Jul. 15, 2014

(54) LATENT HEAT STORAGE DEVICE

(75) Inventor: Gerd Gaiser, Reutlingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 1001 days.

(21) Appl. No.: 12/839,000

(22) Filed: Jul. 19, 2010

(65) Prior Publication Data

US 2011/0016858 A1 Jan. 27, 2011

(30) Foreign Application Priority Data

Jul. 24, 2009 (DE) .......................... 10 2009 034 655

(51) Int. Cl.
*F28D 17/00* (2006.01)
*F28D 19/00* (2006.01)
*F28F 3/00* (2006.01)

(52) U.S. Cl.
USPC ............................................ 165/10; 165/166

(58) Field of Classification Search
USPC ................................... 165/10, 166
See application file for complete search history.

(56) References Cited

U.S. PATENT DOCUMENTS

| 4,073,284 A | * | 2/1978 | Laing | 165/10 |
| 5,468,455 A | | 11/1995 | Brück | |
| 2005/0051294 A1 | * | 3/2005 | Fujita et al. | 165/10 |
| 2006/0196632 A1 | * | 9/2006 | Kudo | 165/10 |

FOREIGN PATENT DOCUMENTS

| CH | 666118 A5 | 6/1988 |
| DE | 87 17 394.8 | 5/1988 |
| DE | 10329153 A1 | 1/2005 |
| DE | 10 2004 052 106 A1 | 5/2006 |
| DE | 102004052106 A1 | 5/2006 |
| DE | 10 2005 028 044 A1 | 12/2006 |
| EP | 0596854 A1 | 5/1994 |
| FR | 2081113 A1 | 12/1971 |
| WO | WO 2008/050210 A2 | 5/2008 |

* cited by examiner

*Primary Examiner* — Ljiljana Ciric
(74) *Attorney, Agent, or Firm* — Reinhart Boerner Van Deuren P.C.

(57) ABSTRACT

A latent heat storage device for an exhaust system of a combustion engine of a motor vehicle, with a storage body having a plurality of channels running parallel to one another, of which at least some contain a phase-changing material.

The storage body is formed through a layer structure with at least two plates of which at least one is corrugated and which contact each other and are fastened to each other in such a manner that the corrugations of the at least one plate form the channels.

13 Claims, 5 Drawing Sheets

LATENT HEAT STORAGE DEVICE

CROSS-REFERENCE TO RELATED PATENT APPLICATIONS

This patent application claims the benefit of German Patent Application No. 10 2009 034 655.4, filed Jul. 24, 2009, the entire teachings and disclosure of which are incorporated herein by reference thereto.

FIELD OF THE INVENTION

The present invention relates to a latent heat storage device for an exhaust system of a combustion engine, more preferably of a motor vehicle.

BACKGROUND OF THE INVENTION

A latent heat storage device is more preferably characterized by the use of a phase-changing material for heat storage. Such a phase-changing material, which is usually salts, performs a phase change between liquid phase and solid phase at the respective desired storage temperature desired. When charging the latent heat storage device the heat storage material melts while it solidifies on discharge. Below the storage temperature, that is below the phase-changing temperature of the phase-changing material, the latent heat storage device thus formed can only store sensible heat, that is in form of a temperature increase of the solid phase-changing material. When the phase-changing material has been heated up to its phase-changing temperature it melts, resulting in latent heat storage through the phase change. In the process, the heat thus stored is stored at the temperature level of the storage temperature and can also be retrieved at this temperature. In addition, the liquid phase-changing material can be heated additionally which in turn results in sensible that is temperature-dependent heat storage. By selecting the phase-changing material the storage temperature of the latent heat storage device can be adapted to the respective operating purpose of the latent heat storage device.

More preferably with vehicle applications, latent heat storage devices can be used to keep the combustion engine or individual components of an exhaust system at operating temperature for as long as possible in order to increase the efficiency of the respective component or of the combustion engine. Since there is increasing interest in such latent heat storage devices, solutions for cost-effective manufacturing are sought which are more preferably suitable for series production.

SUMMARY OF THE INVENTION

Embodiments of the present invention deal with the problem of stating an improved embodiment for a latent heat storage device of the type mentioned at the outset, which is more preferably characterized in that it can be produced comparatively cost-effectively.

According to the embodiments of the invention, this problem is solved through the subject of the independent claim. Advantageous embodiments are the subject of the dependent claims.

Embodiments of the invention are based on the general idea of forming a storage body of the latent heat storage device through a layer structure, which is produced with the help of a plurality of plates. At least one of these plates is corrugated. The plates abut one another and are fastened to one another. Because of this, the corrugations of the at least one plate forms channels within the storage body which run parallel to one another and of which at least some can be filled with a phase-changing material. Such a layer structure of plates can more preferably be produced simply and cost-effectively. It is more preferably also suitable for series production.

The two plates can abut each other along contact lines and be fastened to each other along such contact lines, for example by means of weld seams or soldered connections. In order to reduce stresses due to heat within the storage body it can be provided that the two plates are loosely placed against one another along some such contact lines. In the region of these contact lines placed loosely against one another relative movements can thus occur between the two plates which reduces the establishment of thermally induced stresses within the storage body.

In addition or alternatively it is possible to configure both plates corrugated. Transversely to the longitudinal direction of the corrugations the plates have a certain bending-elasticity as a result, which makes it possible to offset or absorb thermal stresses.

Further important features and advantages of the invention are obtained from the subclaims, from the drawings and from the corresponding figure description by means of the drawings.

It is to be understood that the features mentioned above and still to be explained in the following can not only be used in the respective combination stated but also in other combinations or by themselves, without leaving the scope of the present invention.

BRIEF DESCRIPTION OF THE DRAWINGS

Preferred exemplary embodiments of the invention are shown in the drawings and are explained in more detail in the following description, wherein same reference characters relate to same or similar or functionally same components.

It shows, in each case schematically.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
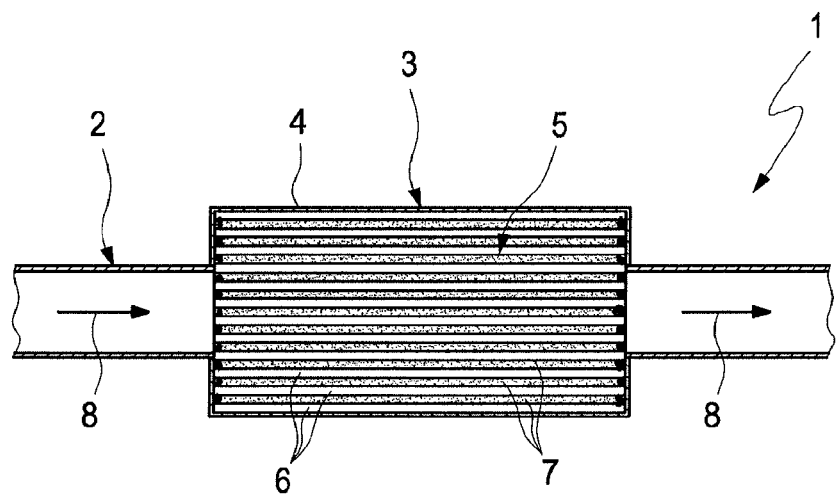
FIG. 1 is a greatly simplified schematic representation of an exhaust system in the region of a latent heat storage device.

According to FIG. 1, an exhaust system 1 of a combustion engine which is not otherwise shown, which more preferably can be arranged in a motor vehicle, comprises an exhaust line 2, in which a latent heat storage device 3 is arranged or incorporated. The latent heat storage device 3 in a housing 4 contains a storage body 5 having a plurality of channels which run parallel to one another and which contain a phase-changing material 7. Here, not all channels 6 have to be filled with the phase-changing material 7. It is more preferably possible to incorporate some of the channels 6 in the exhaust line 2 such that an exhaust gas flow 8 transported in the exhaust line 2 can flow through these. The channels 6 filled with phase-changing material 7 are designated 6' in the sectional representations of FIGS. 2 to 12, while the channels 6 not filled with the phase-changing material 7, through which more preferably exhaust gas can flow, are designated 6" in FIGS. 2 to 12.

According to FIGS. 2 to 12 the storage body 5 with the latent heat storage device 3 introduced here is formed by a layer structure 9 containing the channels 6 and which in the representations of FIGS. 2 to 12 are cut transversely to the longitudinal direction of the channels 6 and only shown partially. The layer structure 9 is formed with at least two plates 10, 11 of which at least the one plate 10 is corrugated, while the other plate 11 in the embodiments of FIGS. 2 to 6 is un-corrugated or smooth and more preferably configured flat. With the embodiments of FIGS. 7, 8, 11 and 12 the other plate 11 is also of a corrugated design. With the embodiments of FIGS. 9 and 10 the other plate 11 is partially corrugated and partially un-corrugated or flat and more preferably designed level.

To produce the layer structure 9 the two plates 10, 11 are placed on top of each other and fastened to each other in the form of a layer. Here, the corrugations of the at least one plate 10 form the channels 6 jointly with the other plate 11. Depending on the point of view the corrugated plate 10 contacts the other plate 11 in the region of its crest lines of the wave mountains or wave valleys facing the respective other plate 11. Contact is thus linear. In the case of straight-line wave structures these contact lines are also linear. Along such contact lines the two plates 10, 11 are preferably fastened to each other. Suitable fastening points are symbolised in FIGS. 2 and 6 to 12 through thickened regions and designated 12. The fastening points 12 can for example be realised through weld seams or through soldered connections.

Figure 2:
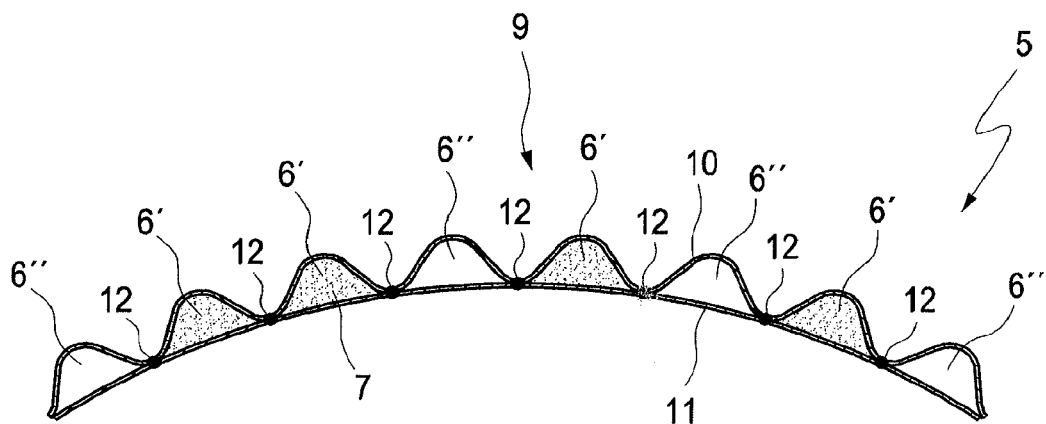
FIGS. 2 to 12 are sectional views through a part of a storage body of the latent heat storage device with various embodiments.
Figure 3:
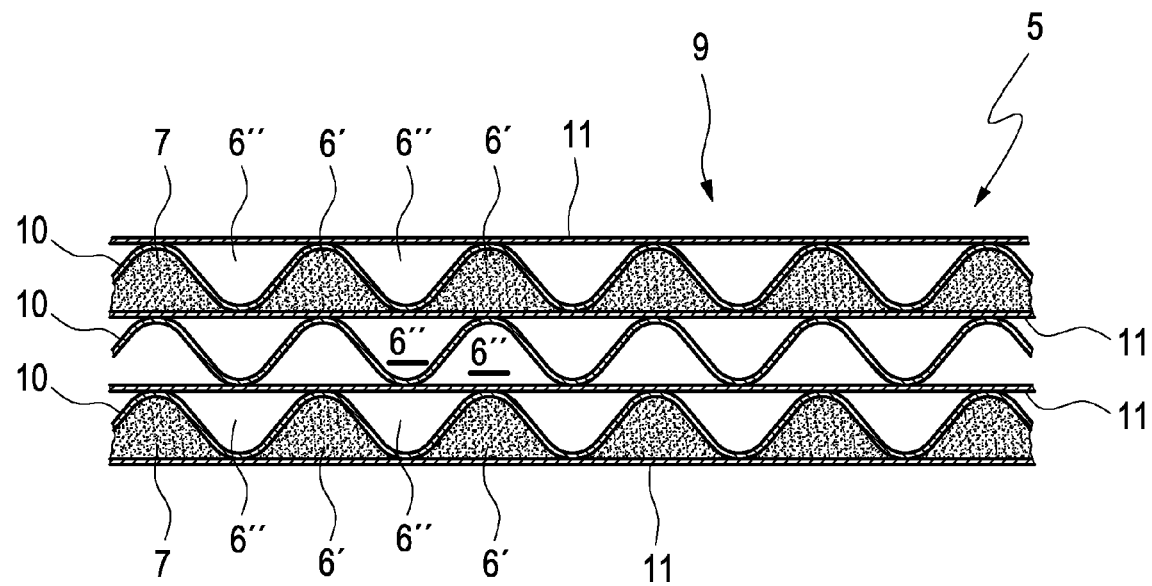
Figure 4:
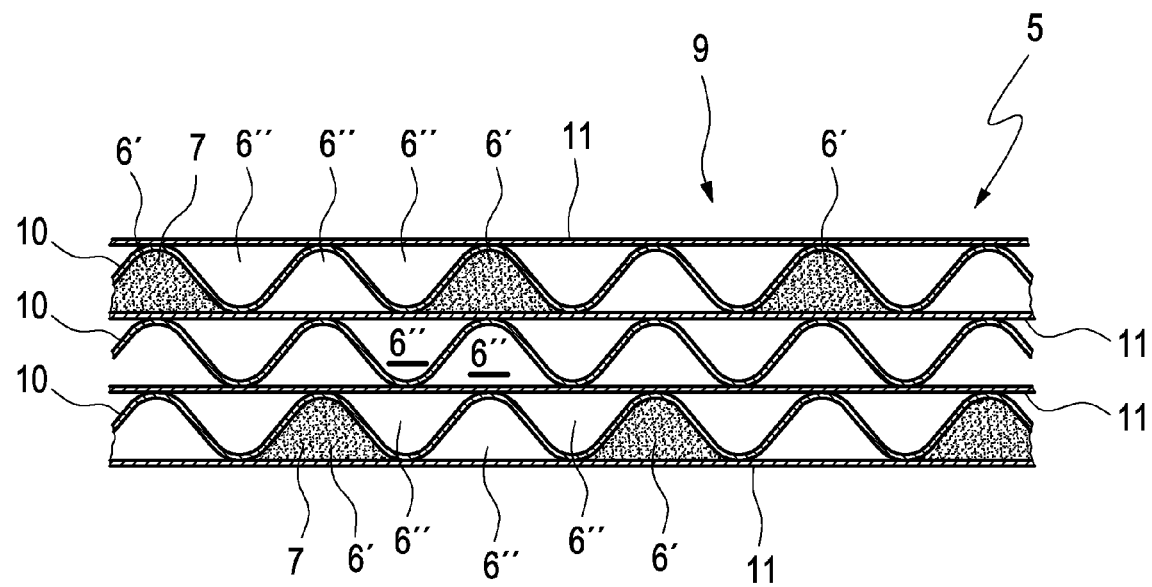
Figure 5:
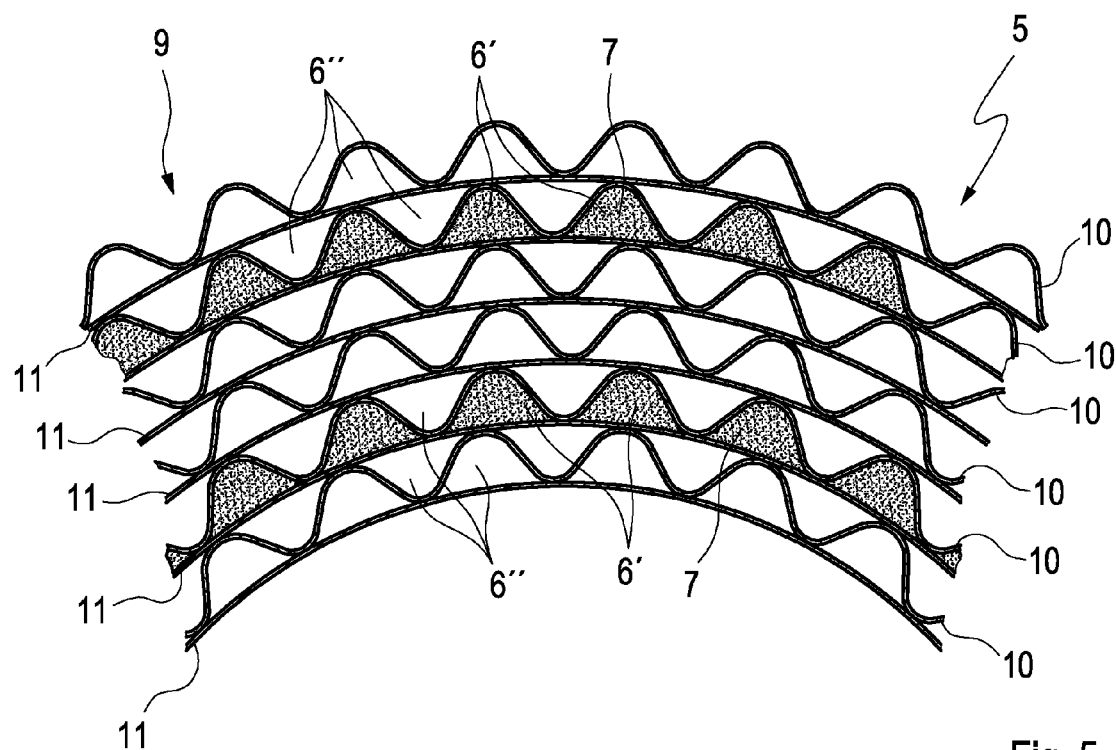

To produce the layer structure 9 the plates 10, 11 can be wound for example spirally which is indicated in the curved representations of FIGS. 2 and 5. It is likewise possible to layer or stack the two plates 10, 11 on top of each other by pairs in level layers which are indicated in FIGS. 3, 4 and 6 to 12. Both manufacturing methods can be realised comparatively easily and are more preferably suitable for series production.

Figure 6:
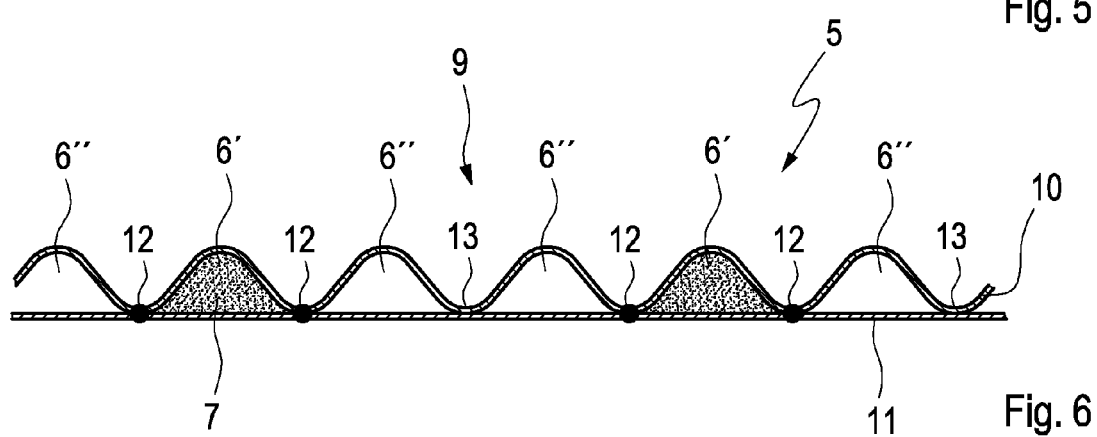
Figure 7:
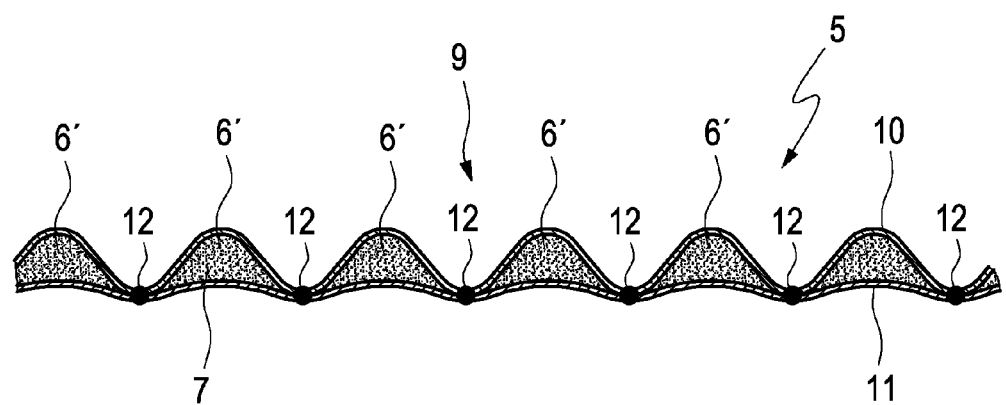
Figure 8:
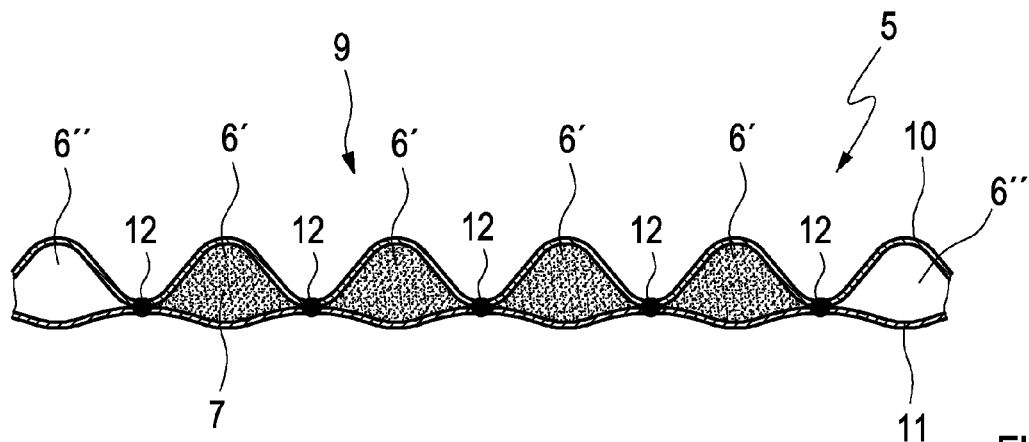
Figure 9:
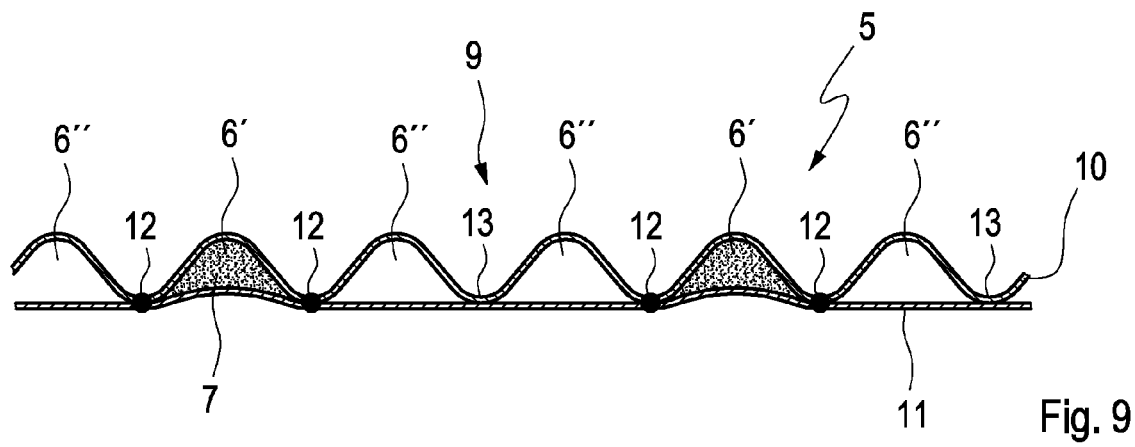
Figure 10:
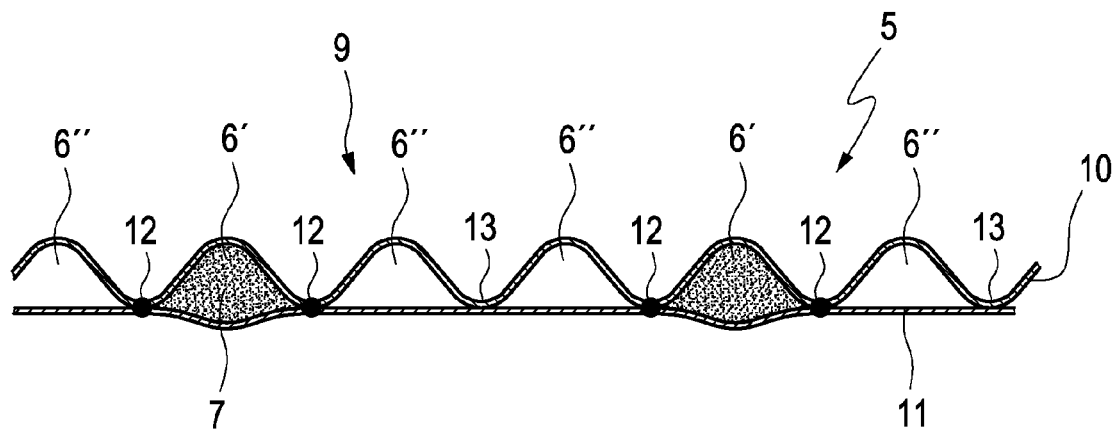

With the embodiments shown in FIGS. 2, 7, 8, 11 and 12 the two plates 10, 11 are fastened to each other along all contact lines. FIGS. 6, 9 and 10 in contrast show embodiments wherein the two plates 10, 11 are fastened to each other only along such contact lines as are located on both sides of filled channels 6'. In the region of the remaining contact lines the two plates 10, 11 contact each other loosely. Such loose contact points are designated 13 in FIGS. 6, 9 and 10. Such configuration makes possible relative movements between the two plates 10, 11. Relative movements of this type can for example occur due to thermal expansion effects and reduce thermally induced stresses within the layer structure 9.

The channels 6' filled with the phase-changing material 7 are laterally sealed through the fastening points 12 which for this purpose are embodied continuously. At its longitudinal ends these filled channels 6' are likewise sealed in a suitable manner. Through the sealing of the filled channels 6' at the ends the phase-changing material 7 is encapsulated within these channels 6' away from the outside, so that it remains within the sealed channels 6' provided for this purpose even in the liquid state. The channels 6' provided for conducting gas are open at the ends. Through the number of filled channels 6' and unfilled channels 6" as well as through their spatial arrangement within the layer structure 9 the heat storage capacity of the latent heat storage device 3 and the heat transfer within the latent heat storage device 3 can be influenced. FIGS. 3 to 5 show purely exemplarily different configurations which lead to different storage capacities and heat transfer rates. In addition, the number of channels 6" that can be subjected to through-flow can be predetermined through the maximum exhaust gas flow 8 occurring in the exhaust system 1 or through the permissible flow resistance, which also co-determines the design of the layer structure 9.

The channels 6" that can be subjected to through-flow can more preferably be coated at least partially in a catalytically active manner as a result of which it is possible to integrate a catalyst in the latent heat storage device 3. Because of this, the heat storage and the heat release within the latent heat storage device 3 can take place directly where the heat may be required or is provided for charging the heat storage device 3. Because of this, the latent heat storage device 3 works particularly efficiently.

To this end, the phase-changing material 7 can be so selected that its phase-changing temperature is at or above a start-up temperature of the respective catalyst material. Because of this, a standby function can be realised for the respective catalyst since with the help of the phase-changing material 7 the catalyst can be kept at the temperature level of the phase-changing temperature for a relatively long period. Catalytic coatings which are suitable for realisation of such a standby function are for example TWC (Three Way Catalyst) or DOC (Diesel Oxidation Catalyst). Alternatively (or when using two different phase-changing materials, additionally) it is possible to select the phase-changing material so that its phase-changing temperature is at the upper end of a permissible operating temperature window of the respective catalyst. Because of this, overheating of the respective catalyst can be avoided. If the temperature of the catalyst increases greatly and reaches the upper temperature limit of its operating temperature window, the phase-changing temperature is reached and the phase-changing material 7 melts, absorbing heat in the process. During this latent heat absorption a temperature increase in the catalyst is greatly reduced as a result of which it can be protected from overheating. Catalytic coatings, which are suitable for such a function, are more preferably NSK (NOX Storage Catalyst) and POC (Particle Oxidation Catalyst). As indicated above, the latent heat storage device 3 of a particular embodiment can realise both prescribed functionalities if two different phase-changing materials 7 are used in separate channels 6, which differ from each other through different phase-changing temperatures.

The embodiments of FIGS. 7 to 12 show layer structures 9, where both plates 10, 11 have corrugations. Here, the wave structures of both plates 10, 11 preferably have same wavelengths. This means the spacing transversely to the corrugation longitudinal direction between two immediately adjacent crests is approximately the same size with both plates 10, 11. In addition, the wave structures of the two plates 10, 11 according to the embodiments shown here, can have different amplitudes. As is evident the first plate 10 shown in FIGS. 7 to 12 above has greater amplitudes, that is greater spacings between wave trough and wave crest than the lower or second plate 11. For example the amplitudes of the one plate 10 are two to ten times greater than the amplitudes of the other plate 11.

Provided that both plates 10, 11 have corrugations, thermally induced expansion effects within the layer structure 9 can be better absorbed or compensated.

Figure 11:
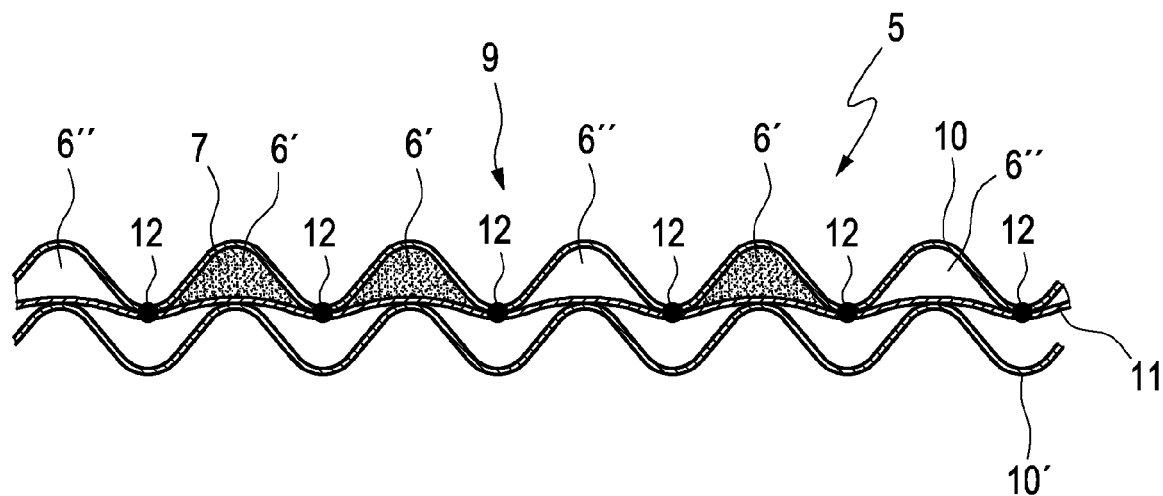
Figure 12:
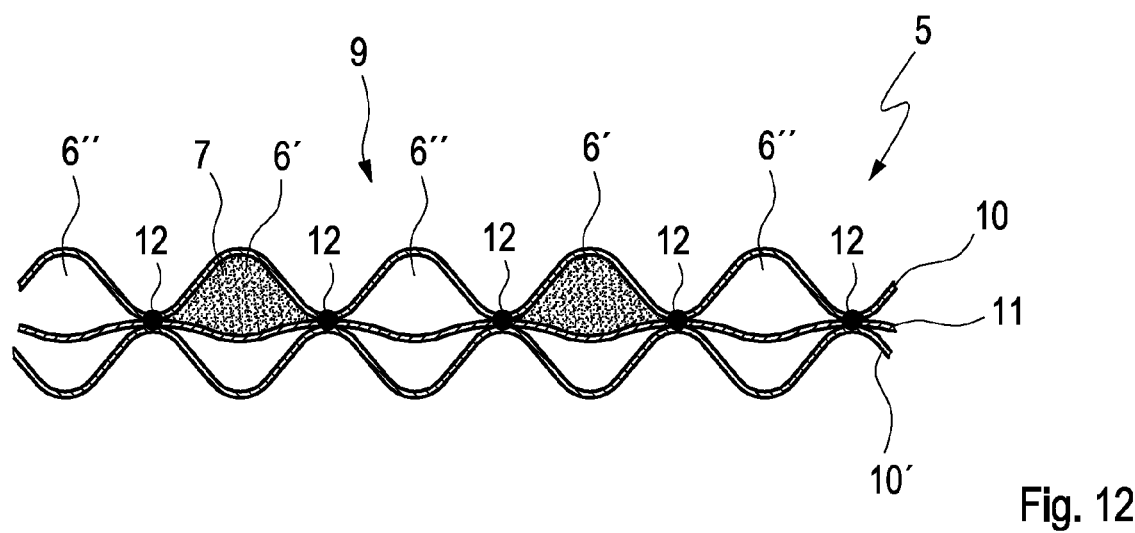

FIGS. 7, 9 and 11 show embodiments wherein the plates 10, 11 with respect to their wave structures are in in-phase contact with each other. This means the wave troughs of the one plate 10 contact the other plate 11 likewise in the region of wave troughs. Such a configuration can also be designated bi-concave wave pairing. In contrast with this, FIGS. 8, 10 and 12 show configurations wherein the plates 10, 11 with respect to their wave structures contact each other in a phase-shifted manner. This is evident in that the wave troughs of the one plate 10 contact the other plate 11 in the region of its wave crests. Such a configuration can also be designated concave-convex wave pairing. It is clear that other phase shifts are also possible which are greater or smaller than half a wave length.

FIGS. 9 and 10 show special embodiments wherein between two adjacent filled channels 6' at least one unfilled channel 6" is arranged, wherein it is additionally provided that the second plate 11 is equipped with a corresponding wave only in the region of the filled channels 6'. In the region of the unfilled channels 6" the second plate 11 with these embodiments is configured un-corrugated or flat and more preferably level. The configuration shown in FIG. 9 can be designated selective bi-concave wave pairing, while the configuration shown in FIG. 10 can be designated selective concave-convex wave pairing.

These configurations are characterized in that in the event that a plurality of unfilled channels 6" is adjacent to one another within the storage structure 5, greater movability for offsetting thermal expansion effects is present. FIG. 11 shows an advantageous possibility for a bi-concave wave pairing to arrange adjacent wave pairs or wave plate pairs. As is evident, an adjacent additional first plate 10' is positioned in-phase with the plates 10, 11 of the completely shown wave pairing, so that the wave crests facing the second plate 11 of the wave pairing of the additional first plate 10 are in contact in the region of the wave crests of the second plate 11 of the wave pairing. Through the in-phase arrangement within the wave pairing the contact lines of the adjacent plate 10' are located between the contact lines within the wave pairing.

With the configuration shown in FIG. 12 the additional plate 10' with its wave crests likewise is in contact in the region of the wave crests of the facing second plate 11 of the wave pairing. Through the phase shift within the wave pairing the contact lines between the additional plate 10' and the second plate 11 of the wave pairing coincide with the contact lines within the wave pairing. The arrangement suggested here makes for a particularly compact construction.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A latent heat storage device for an exhaust system of a combustion engine, comprising:
    a storage body having a plurality of channels including first channels and second channels running parallel to one another; wherein all of the plurality of channels of the storage body run parallel to one another;
    wherein the first channels contain a phase-changing material;
    wherein the second channels are free of the phase-changing material;
    wherein the storage body is formed by a layer structure with at least two plates;
    wherein at least one of the least two plates is corrugated;
    wherein the at least one of the at least two plates contacts a second one of the at least two plates; and
    wherein the at least one of the at least two plates is fastened to the second one of the at least two plates in such a manner that corrugations of the at least one of the first two plates form the first and second channels.

2. The latent heat storage device according to claim 1, wherein the at least two plates are wound spirally.

3. The latent heat storage device according to claim 1, wherein the at least two plates are stacked on top of each other in pairs in level layers.

4. The latent heat storage device according to claim 1, wherein the at least two plates contact each other along contact points and are fastened to each other along such contact lines.

5. The latent heat storage device according to claim 4, wherein adjacent to the first channels containing the phase changing materials are at least one of the first channels containing the phase changing material and one of the second channels free of the phase changing material and wherein the at least two plates are fastened to each other only along the contact lines which are arranged on sides of the first channels containing the phase changing materials.

6. The latent heat storage device according to claim 4, wherein the at least two plates contact each other along some contact lines.

7. The latent heat storage device according to claim 1, wherein the first channels filled with phase-changing material are sealed at a first longitudinal end thereof and at a second longitudinal end thereof.

8. The latent heat storage device according to claim 1, wherein at least one of the at least two plates is un-corrugated.

9. The latent heat storage device according to claim 1, wherein the other of the at least two plates is also corrugated or has corrugations.

10. The latent heat storage device according to claim 9, wherein the corrugations of the at least two plates form wave structures and the at least two plates have the same wave lengths.

11. The latent heat storage device according to claim 9, wherein the corrugations of the at least two plates form wave structures and the at least two plates have different amplitudes.

12. The latent heat storage device according to claim 9, wherein the corrugations of the at least two plates form wave structures and the wave structures contact each other in an in-phase manner.

13. The latent heat storage device according to claim 9, wherein corrugations of the at least two plates form wave structures and the at least two plates contact each other in a phase-shifted manner, by half a wave length.

* * * * *